United States Patent [19]

Hsieh

[11] Patent Number: 5,115,086

[45] Date of Patent: May 19, 1992

[54] PRIMER COMPOSITION FOR IMPROVING THE BONDING OF A URETHANE ADHESIVE

[75] Inventor: Harry W. S. Hsieh, Edison, N.J.

[73] Assignee: Essex Specialty Products, Inc., Clifton, N.J.

[21] Appl. No.: 475,669

[22] Filed: Feb. 6, 1990

[51] Int. Cl.$^5$ .................... C08G 63/20; C09D 167/02
[52] U.S. Cl. .................... 528/272; 528/274; 528/283; 528/288; 528/308.6; 528/48; 528/54; 528/58; 528/67; 528/83; 525/437; 525/440; 524/178; 524/186; 524/241
[58] Field of Search .............. 528/272, 274, 283, 288, 528/308.6, 48, 54, 58, 67, 83; 525/437, 440; 524/178, 186, 241

[56] References Cited

U.S. PATENT DOCUMENTS

| | | | |
|---|---|---|---|
| 3,152,162 | 10/1964 | Fischer et al. | 560/334 |
| 3,459,584 | 8/1969 | Caldwell | 428/412 |
| 3,707,521 | 12/1972 | De Santis | 524/506 |
| 3,779,794 | 12/1973 | De Santis | 428/422.8 |
| 4,020,049 | 4/1977 | Rinehart | 528/274 |
| 4,224,376 | 9/1980 | Ishige et al. | 428/315 |
| 4,418,188 | 11/1983 | Smith et al. | 528/274 |
| 4,511,626 | 4/1985 | Schumacher | 428/425.6 |
| 4,525,511 | 6/1985 | Kirby et al. | 524/158 |
| 4,643,794 | 2/1987 | Saracsan et al. | 156/310 |

*Primary Examiner*—John Kight, III
*Assistant Examiner*—Sam A. Acquah
*Attorney, Agent, or Firm*—Ann K. Galbraith

[57] ABSTRACT

In one aspect, this invention is a primer which comprises a solution of: (a) a polyester resin of a carboxylic acid and a glycol; and (b) a polymethylene poly(phenyl isocyanate), diphenylmethane diisocyanate, or mixture thereof; in a volatile solvent, wherein the weight ratio of (a):(b) is in the range of from about 0.25:1.0 to 2.0:1.0. In a second aspect, this invention is a primer which comprises a solution of: (a) 5–18 weight percent of a polyester resin of a carboxylic acid and a glycol; and (b) 6–17 weight percent of a polymethylene poly(phenyl isocyanate), diphenylmethane diisocyanate, or mixture thereof; in a volatile solvent. It has been discovered that the primer of the invention advantageously provides improved adhesion characteristics of metal-to-glass bonding when used to prime paint-coated metal substrates before the application of a urethane adhesive, particularly when used with a "fast cure" adhesive comprised of an isocyanate-functional prepolymer and dimorpholinediethyl ether.

23 Claims, No Drawings

PRIMER COMPOSITION FOR IMPROVING THE BONDING OF A URETHANE ADHESIVE

BACKGROUND OF THE INVENTION

This invention relates to a primer composition for priming a substrate surface to increase the adhesion of a sealant composition to such a surface. More particularly, this invention relates to a primer composition for priming a substrate surface which has been coated with a coating or paint to increase the adhesion of a sealant composition to such a surface.

Urethane sealants and adhesives are known to provide high tensile strengths and tear strengths when used to bond materials. Such sealants and adhesives are especially suitable for use in automobile manufacture for the bonding of a windshield to an auto body, wherein the firm bonding imparts additional structural integrity to the automobile body. However, some urethane sealants do not bond glass to painted metal sufficiently without the use of a primer to prime the metal substrate. Pimers for use in improving the bonding of glass to painted surfaces are known and are described, for example, in U.S. Pat. No. 4,525,511 which describes a primer comprising a film-forming resin and a strong acid. U.S. Pat. No. 4,643,794 describes a primer for bonding to both glass and metal surfaces which comprises 10 to 20 parts polyester resin, 4 to 5 parts polyisocyanate cross-linking agent, 3 to 9 parts carbon black, and 66 to 83 parts volatile solvent. However, although such a primer is adapted for use on both glass and painted surfaces, it is often preferable to use different primers for priming the metal substrate and the glass which have optimum adhesion characteristics for their particular use in order to meet stringent federal motor vehicle safety standards when such a primer is used to bond windshields in automobiles. Further, it is not especially cumbersome to use multiple primer products during a glass installation process since separate applications of primer to glass and primer to paint are still necessary when a paint primer is used. Therefore, paint primers with improved adhesion characteristics for adhesion to painted surfaces are desirable.

SUMMARY OF THE INVENTION

In one aspect, this invention is a primer which comprises a solution of:
(a) a polyester resin of a carboxylic acid and a glycol; and
(b) a polymethylene poly(phenyl isocyanate), diphenylmethane diisocyanate, or mixture thereof;
in a volatile solvent. wherein the weight ratio of (a):(b) is in the range of from about 0.25:1.0 to 2.0:1.0.

In a second aspect, this invention is a primer which comprises a solution of:
(a) 5-18 weight percent of a polyester resin of a carboxylic acid and a glycol; and
(6-17 weight percent of a polymethylene poly(phenyl isocyanate), diphenylmethane diisocyanate, or mixture thereof;
in a volatile solvent.

It has been discovered that the primer of the invention advantageously provides improved adhesion characteristics of metal-to-glass bonding when used to prime paint-coated metal substrates before the application of a urethane adhesive, particularly when used with a "fast cure" adhesive comprised of an isocyanate-functional prepolymer and dimorpholinediethyl ether. However, the primer of the invention may also be used to prime other types of surfaces for use with other types of adhesives. These and other advantages of this invention are apparent from the following description.

DETAILED DESCRIPTION OF THE INVENTION

The primer of the invention is a liquid mixture, which preferably has a density of about 8 lb/gal before application. After application, the mixture forms a tenacious coating upon solvent evaporation, and completely cures upon exposure to atmospheric moisture.

The polyester resin of a carboxylic acid and a glycol component of the primer (hereafter "polyester resin") is a polymer of a carboxylic acid and a glycol. The polyester resin preferably has a molecular weight of from about 15,000 to about 25,000 and has a glass transition temperature which is preferably in the range of from about 65° C. to about 70° C. This polyester resin is preferably a polymer of at least one aromatic dicarboxylic acid or alkyl ester thereof, and at least one glycol compound. The preparation of these polyester resins is described, for example, in U.S. Pat. No. 3,459,584, column 2, line 40 to column 4, line 3: and U.S. Pat. Nos. 4,020,049 and 4,418,183, which are hereby incorporated by reference in their entirety. Preferred aromatic dicarboxylic acids include 1,3-benzenedicarboxylic acid and 1,4-benzenedicarboxylic acid. Preferred glycols include 1,2-ethanediol. Especially preferred is Vitel TM PE-200, a polyester resin with a molecular weight of about 20,000 sold by the Goodyear Tire and Rubber Co.

The polymethylene poly(phenyl isocyanate), diphenylmethane diisocyanate, or mixture thereof (hereafter "polyisocyanate") is a polyisocyanate which preferably has an NCO equivalent weight of at least about 130, more preferably at least about 133, and most preferably at least about 140; and is preferably no greater than about 500, more preferably no greater than about 300, and most preferably no greater than about 150. The average number of isocyanate groups per molecule of polyisocyanate is preferably at least about 2.4, more preferably at least about 2.7, and most preferably at least about 3.0; and is preferably no greater than about 5.0, more preferably no greater than about 4.0, and most preferably no greater than about 3.5. Preferably, the polyisocyanate comprises a mixture of polymethylene poly(phenyl isocyanate) and diphenylmethane diisocyanate. More preferably, the polymethylene poly(phenyl isocyanate) is present in an amount of at least about 10 percent of the polyisocyanate mixture, on a weight basis. Examples of suitable polyisocyanates include PAF TM 20, PAPI TM 27, and PAPI TM 580. sold by The Dow Chemical Company, Lupranate TM M200, sold by BASF Corporation Chemicals Division, and PBA-2257 and PBA-2262, sold by ICI.

In addition, derivatives of 4,4'-diphenylmethane diisocyanate which are liquid at room temperature such as, for example, polyisocyanates which have carbodiimide groups in their backbone or mixtures thereof may also be used. The preparation of these materials is disclosed in U.S. Pat. No. 3,152,162, which is hereby incorporated by reference in its entirety. An example of a commercial material of this type is Isonate TM 143L Isocyanate, a product of The Dow Chemical Company.

The polyester resin and the polyisocyanate are combined in a manner such that the weight ratio of (a):(b) is preferably at least about 0.25:1.0, more preferably at least about 0.33:1.0, and most preferably at least about 0.5:1.0; and is preferably no greater than about 2.0:1.0, more preferably no greater than about 1.5:1.0, and most preferably no greater than about 1.0:1.0.

In the primer of the second aspect of the invention, the polyester resin preferably comprises at least about 5 weight percent, more preferably at least about 7 weight percent, and most preferably at least than about 8 weight percent: and is preferably no greater than about 18 weight percent, more preferably no greater than about 13 weight percent, and most preferably no greater than about 10 weight percent of the total primer. The polyisocyanate preferably comprises at least about 6 weight percent, more preferably at least about 8 weight percent, and most preferably at least about 10 weight percent; and is preferably no greater than about 17 weight percent, more preferably no greater than about 15 weight percent, and most preferably no greater than about 13 weight percent of the total primer.

The volatile solvent component of the primer of the invention may be any solvent, which is preferably anhydrous in order to prevent the isocyanate from reacting with any water present, which will dissolve the polyester resin at a temperature in the range of from about 20° C.-25° C. Examples of such solvents include xylene, methylene chloride, benzene, monochlorobenzene, trichloroethylene, ethylene chloride, toluene, acetone, and methyl ethyl ketone, and mixtures thereof, and is preferably acetone or methyl ethyl ketone, or a mixture thereof. More preferably, the solvent is a mixture of acetone and methyl ethyl ketone. The solvent is preferably used in an amount of at least about 50 percent, more preferably at least about 55 percent, and most preferably at least about 60 percent; and is preferably no greater than about 90 percent, more preferably no greater than about 85 percent, and most preferably no greater than about 80 percent, based on the weight of the total primer.

Catalysts which promote the reaction of the polyisocyanate with atmospheric moisture and with active hydrogen groups present on the substrate which is primed may also be included in the primer of the invention and include, for example, a stannous or stannic compound, such as a stannous salt of a carboxylic acid (e.g., stannous octoate, stannous oleate, stannous acetate, and stannous laurate), a trialkyltin oxide, a dialkyltin dicarboxylate (e.g., dibutyltin dilaurate, dibutyltin diacetate, diethyltin diacetate, and dihexyltin diacetate), a dialkyltin dihalide, or a dialkyltin oxide, such as di-2-ethylhexyltin oxide or dioctyltin dioxide, a tertiary amine, or a tin mercaptide. Tertiary amine catalysts include trialkylamines (e.g., trimethylamine, triethylamine), heterocyclic amines, such as N-alkylmorpholines (e.g.. N-methylmorpholine, N-ethylmorpholine, dimethyldiaminodiethyl ethel, etc.), 1,4-dimethylpiperazine, triethylenediamine, etc., and aliphatic polyamines, such as N,N,N',N'-tetramethyl-1,3-butanediamine. Preferably, the catalyst is a mixture of an organic salt of a tertiary amine and a tin compound in an organic solvent. Such a catalyst is sold by Air Products and Chemicals, Inc. under the tradename Dabco ™ DC-2.

Carbon black may also be added to the primer of the invention to modify the rheological properties of the primer, such as viscosity, sag resistance, and flow rate. When carbon black is employed, it is preferably used in an amount of at least about 0.5 percent, more preferably at least about 1.0 percent, and most preferably at least about 2.0 percent; and is preferably no greater than about 5.0 percent, more preferably no greater than about 4.0 percent, and most preferably no greater than about 3.0 percent, based on the weight of the total primer formulation.

Other fillers and additives which may also be used to modify the rheological properties of the primer include, for example, surface-treated fumed silicas, titanium dioxide, calcium carbonate, talc, defoaming agents, mica, aluminum oxide, clays, and glass phenolic, or aluminum oxide bubbles. Such fillers and additives are preferably anhydrous, or dried before use in order to prevent the reaction of any moisture present with the isocyanate. When talc is added it is preferably used in an amount of at least about 3 percent, and more preferably at least about 5 percent; and is preferably no greater than about 9 percent, and more preferably no greater than about 7 percent, based on the weight of the total primer formulation.

Additives which stabilize the free isocyanate groups present in the primer are also preferably employed. Such additives include, for example, diethyl malonate, which is preferably employed in an amount of at least about 0.02 percent, more preferably at least about 0.10 percent, and most preferably at least about 0.50 percent; and is preferably no greater than about 5.0 percent, more preferably no greater than about 2.5 percent, and most preferably no greater than about 1.5 percent, based in the weight of the total primer formulation.

In the preparation and storage of the primer, it is preferable to minimize the moisture content of the primer, so that the free isocyanate groups will not react with the water. Additives which may be employed to reduce the free water content of the primer include, for example, molecular sieves which preferably have a pore diameter of about 3 Å. These molecular sieves are preferably added in an amount of at least about 0.01 percent, and more preferably at least about 0.03 percent; and is preferably no greater than about 1.0 percent, and more preferably no greater than about 0.1 percent, based on the weight of the total primer formulation.

The primer of the invention may be used to prime a substrate for use with any one-component or two component adhesive by applying at least one coat of the primer to the substrate prior to the application of an adhesive. The primer of the invention is especially well adapted for use with a urethane adhesive, particularly a moisture-curable urethane adhesive, and more particularly a "fast cure" urethane adhesive comprised of an isocyanate-functional prepolymer and dimorpholinediethyl ether, of the type which is described, for example, in U.S. Pat. Nos. 4,758,648 and 4,780,520, which are hereby incorporated by reference in their entirety. Other urethane sealants which may be used with the primer of the invention include, for example, sealants of the type described in U.S. Pat. Nos. 3,707,521, 3,779,794, 4,624,996, 4,625,012, 4,758,648, and 4,719,267, which are hereby incorporated by reference in their entirety. The primer of the invention may be used to prime any type of substrate, but is especially well adapted for use with a painted substrate such as, for example, a metal substrate painted with a paint system comprising a base coat of an enamel paint coated with a clear coat of a polyurethane or acrylic melamine, or a monocoat of acrylic melamine high solids enamel.

ILLUSTRATIVE EMBODIMENTS

The following examples are given to illustrate the invention and should not be interpreted as limiting it in any way. Unless stated otherwise, all parts and percentages are given by weight.

EXAMPLE 1

Vitel ™ PE-200 polyester resin (34.8 g) and 119.2 g of anhydrous methyl ethyl ketone (MEK) are charged into a ball mill which is rolled on a roller for about 30 minutes, or until the polyester resin is completely dissolved in the MEK. Dried talc (32.7 g), dried carbon black (8.2 g), and a 3 Å molecular sieve powder (0.2 g) are added to the ball mill and ground for about 16 hours. PAPI ™ 20 polyisocyanate (59.3 g), anhydrous acetone (91.6 g), diethyl malonate (2.0 g), methyl ethyl ketone (101.0 g), and Dabco ™ DC-2 urethane catalyst (1.8 g) are added to the ball mill and ground for 1 hour.

EXAMPLE 2

Using the procedure of Example 1, primers are prepared using the following amounts of components, and are used to prime a painted metal substrate before the application of a urethane adhesive:

TABLE I

|  | 2A | 2B | 2C | 2D | 2E |
|---|---|---|---|---|---|
| methyl ethyl ketone, g | 220.2 | 220.2 | 220.2 | 220.2 | 220.2 |
| Vitel ™ PE-200 polyester resin, g | 72.7 | 59.2 | 47.1 | 34.8 | 21.4 |
| talc, g | 32.7 | 32.7 | 32.7 | 32.7 | 32.7 |
| carbon black, g | 8.2 | 8.2 | 8.2 | 8.2 | 8.2 |
| 3Å molecular sieves, g | 0.2 | 0.2 | 0.2 | 0.2 | 0.2 |
| PAPI ™ 20 polyisocyanate, g | 21.4 | 34.9 | 47.1 | 59.3 | 72.7 |
| acetone, g | 91.6 | 91.6 | 91.6 | 91.6 | 91.6 |
| diethyl malonate, g | 2.1 | 2.1 | 2.1 | 2.1 | 2.1 |
| Dabco ™ urethane catalyst, g | 0.9 | 0.9 | 0.9 | 0.9 | 0.9 |
| Weight ratio of Vitel ™ PE-200/ PAPI ™ 20 | 3.4:1.0 | 1.7:1.0 | 1.0:1.0 | 0.59:1.0 | 0.29:1.0 |

Lap shear testing is performed as follows: a plate glass is washed with a mild soap and warm water solution, rinsed thoroughly, and dried with a clean towel. The glass is then rinsed with acetone and dried with a clean towel. Painted panels are primed with freshly shaken primer which is applied with a clean paint dauber and dried for at least 30 minutes. The glass is wiped with a silane primer, which is then wiped off again 10 seconds after application. A glass primer is then applied and allowed to dry for at least 30 minutes. The painted panels are attached to a lap shear board, and a bead of a urethane sealant comprising a prepolymer and dimorpholinediethyl ether, sold as Essex Specialty Products' 573.02 sealant, approximately ¼" wide by 5/16" high is run along the width of the glass and approximately ¼" to ½" from the primed end. The primed panel is immediately placed on the sealant and the sample is allowed to cure in an environmental chamber at 25° C. and 50 percent relative humidity for 5 days. The samples are lap shear tested on an Instron ™ machine at a crosshead speed of 1.0 in/min. The remaining bead width of the samples is measured at five different places and the results averaged. The average lap shear is calculated by dividing the test load by the average cross section of the remaining sealant. The average results for three samples is shown below.

TABLE II

| polyester resin/ PAPI ™ 20 ratio | Lap Shear, psi/mode of failure (%) | |
|---|---|---|
|  | Paint Sample #1* | Paint Sample #2* |
| 3.4:1.0 | 524/20% CF<br>40% PF<br>40% PTL | 880/97% CF<br>3% PF |
| 1.7:1.0 | 768/100% CF | 837/60% CF<br>40% PF |
| 1.0:1.0 | 608/25% CF<br>75% PTL | 656/100% CF |
| 0.59:1.0 | 875/97% CF<br>3% PTL | 755/97% CF<br>3% PTL |
| 0.29:1.0 | 869/100% CF | 542/100% PF |

*Paint Sample #1 is a metal substrate painted with a paint system comprising a base coat of an enamel paint coated with a clear coat of a polyurethane or acrylic melamine, which is manufactured by BASF. Paint Sample #2 is a metal substrate painted with a similar paint system manufactured by DuPont.
PF—Paint Primer Failure
CF—Cohesive Failure within the sealant
PTL—Paint Lifting - failure occurs within substrate

EXAMPLE 3

Using the procedure of Example 1, primers are prepared using the following amounts of components, and are used to prime a painted metal substrate before the application of a urethane adhesive.

TABLE III

|  | 3A | 3B | 3C | 3D | 3E | 3F |
|---|---|---|---|---|---|---|
| methyl ethyl ketone, g | 220.2 | 220.2 | 220.2 | 220.2 | 220.2 | 220.2 |
| Vitel ™ PE-200 polyester resin, g | 34.8 | 34.8 | 59.2 | 47.1 | 34.8 | 34.8 |
| talc, g | 32.7 | 32.7 | 32.7 | 32.7 | 32.7 | 32.7 |
| carbon black, g | 8.2 | 8.2 | 8.2 | 8.2 | 8.2 | 8.2 |
| 3Å molecular sieves, g | 0.2 | 0.2 | 0.2 | 0.2 | 0.2 | 0.2 |
| polyisocyanate*, g | 59.3 | 59.3 | 34.9 | 47.1 | 59.3 | 59.3 |
| Acetone, g | 91.6 | 91.6 | 91.6 | 91.6 | 91.6 | 91.6 |
| diethyl malonate, g | 2.1 | 2.1 | 2.1 | 2.1 | 2.1 | 2.1 |
| Dabco ™ urethane catalyst, g | 1.8 | — | — | — | 1.8 | 1.8 |

*Ex. 3A—PAPI ™ 27 - NCO functionality - 2.7
Ex. 3B—PAPI ™ 20 - NCO functionality - 3.0
Ex. 3C—PAPI ™ 20
Ex. 3D—PAPI ™ 20
Ex. 3E—PBA 2262 - NCO functionality - 2.7
Ex. 3F—Lupranate ™ M-200 - NCO functionality - 3.0

What is claimed is:

1. A primer which comprises a solution of:
   (a) a polyester resin of a carboxylic acid and a glycol;
   (b) a polymethylene poly(phenyl isocyanate), diphenylmethane diisocyanate, or mixture thereof;
in a volatile solvent, wherein the weight ratio of (a):(b) is in the range of from about 0.25:1.0 to 1.5:1.0.

2. The primer of claim 1 wherein the weight ratio of (a):(b) is at least about 0.33:1.0.

3. The primer of claim 1 wherein the weight ratio of (a):(b) is at least about 0.5:1.0.

4. The primer of claim 1 wherein the weight ratio of (a):(b) is no greater than about 1.0:1.0.

5. The primer of claim 1 wherein the polyester resin of a carboxylic acid and a glycol is a polymer of 1,3-benzenedicarboxylic acid, 1,4-benzenedicarboxylic acid and 1,2-ethanediol.

6. The primer of claim 1 wherein component (b) comprises at least one diphenylmethane diisocyanate.

7. The primer of claim 6 wherein component (b) comprises a mixture of polymethylene poly(phenyl isocyanate) and diphenylmethane diisocyanate.

8. The primer of claim 1 wherein the volatile solvent comprises a mixture of methyl ethyl ketone and acetone.

9. The primer of claim 1 which additionally comprises a catalyst comprising a mixture of an organic salt of a tertiary amine and a tin compound in an organic solvent.

10. The primer of claim 1 wherein the average number of isocyanate groups per molecule of polyisocyanate is in the range of from about 2.4 to about 5.0.

11. A primer which comprises a solution of:
  (a) 5-10 weight percent of a polyester resin of a carboxylic acid and a glycol; and
  (b) 6-17 weight percent of a polymethylene poly(phenyl isocyanate), diphenylmethane diisocyanate, or mixture thereof.

12. The primer of claim 11 wherein the weight percent of component (a) is at least about 7 weight percent.

13. The primer of claim 12 wherein the weight percent of component (a) is at least about 8 weight percent.

14. The primer of claim 11 wherein the weight percent of component (b) is at least about 8 weight percent.

15. The primer of claim 14 wherein the weight percent of component (b) is at least about 10 weight percent.

16. The primer of claim 11 wherein the weight percent of component (b) is no greater than about 15 weight percent.

17. The primer of claim 16 wherein the weight percent of component (b) is no greater than about 13 weight percent.

18. The primer of claim 11 wherein the polyester resin of a carboxylic acid and a glycol is a polymer of 1,3-benzenedicarboxylic acid or 1,4-benzenedicarboxylic acid, and 1,2-ethanediol or ethylene glycol.

19. The primer of claim 11 wherein component (b) comprises at least one diphenylmethane diisocyanate.

20. The primer of claim 17 wherein component (b) comprises a mixture of polymethylene poly(phenyl isocyanate) and diphenylmethane diisocyanate.

21. The primer of claim 11 which additionally comprises a catalyst comprising a mixture of an organic salt of a tertiary amine and a tin compound in an organic solvent.

22. The primer of claim 11 wherein the volatile solvent comprises a mixture of methyl ethyl ketone and acetone.

23. The primer of claim 11 wherein the average number of isocyanate groups per molecule of polyisocyanate is in the range of from about 2.4 to about 5.0.

* * * * *